United States Patent
Batdorf et al.

(10) Patent No.: US 9,150,805 B2
(45) Date of Patent: Oct. 6, 2015

(54) PRESSURIZED PLASMA ENHANCED REACTOR

(75) Inventors: James Batdorf, Kennewick, WA (US);
David Lamar, W. Richland, WA (US);
Dieter Olson, Richland, WA (US)

(73) Assignee: INENTEC INC., Bend, OR (US)

( * ) Notice: Subject to any disclaimer, the term of this patent is extended or adjusted under 35 U.S.C. 154(b) by 163 days.

(21) Appl. No.: 12/787,222

(22) Filed: May 25, 2010

(65) Prior Publication Data
US 2010/0300871 A1    Dec. 2, 2010

Related U.S. Application Data

(60) Provisional application No. 61/181,099, filed on May 26, 2009.

(51) Int. Cl.
| | |
|---|---|
| *B01J 19/08* | (2006.01) |
| *C10J 3/86* | (2006.01) |
| *C10J 3/18* | (2006.01) |
| *C10J 3/57* | (2006.01) |
| *C10J 3/84* | (2006.01) |
| *F23G 5/08* | (2006.01) |
| *C10J 3/78* | (2006.01) |

(Continued)

(52) U.S. Cl.
CPC .... *C10J 3/86* (2013.01); *C10J 3/18* (2013.01); *C10J 3/57* (2013.01); *C10J 3/78* (2013.01); *C10J 3/84* (2013.01); *F16J 15/16* (2013.01); *F23G 5/085* (2013.01); *F28D 19/02* (2013.01); *C10J 2200/09* (2013.01); *C10J 2200/12* (2013.01); *C10J 2300/1238* (2013.01); *C10J 2300/1884* (2013.01); *Y02E 20/12* (2013.01)

(58) Field of Classification Search
CPC ............... C10J 3/18; C10J 3/57; C10J 3/84; C10J 3/78; C10J 3/86; C10J 2200/09; C10J 2200/12; C10J 2300/1238; C10J 2300/1884; F28D 19/02; F23G 5/085; F23G 2202/701; F23G 2900/15001; F23G 5/0276; F23G 2201/40; F23G 2204/01; Y02E 20/12; F16J 15/16; C03B 5/005
USPC ........................................................ 204/164
See application file for complete search history.

(56) References Cited

U.S. PATENT DOCUMENTS

| | | |
|---|---|---|
| 3,611,366 A | 10/1971 | Hewlett |
| 3,841,239 A | 10/1974 | Nakamura et al. |
| 4,007,015 A | 2/1977 | Barber |

(Continued)

FOREIGN PATENT DOCUMENTS

| | | |
|---|---|---|
| JP | 2002-048321 | 2/2002 |
| WO | 2008/092964 A1 | 8/2008 |

(Continued)

OTHER PUBLICATIONS

International Search Report and Written Opinion dated Sep. 15, 2010 of Application No. PCT/US10/36044.

(Continued)

*Primary Examiner* — Xiuyu Tai
(74) *Attorney, Agent, or Firm* — Dorsey & Whitney LLP

(57) ABSTRACT

The present invention is a vitrification and gasification system that operates at elevated pressures. The system includes a processing chamber having numerous penetrations, and seals for effectively sealing the penetrations to the processing chamber.

17 Claims, 5 Drawing Sheets

(51) Int. Cl.
 *F16J 15/16* (2006.01)
 *F28D 19/02* (2006.01)

(56) References Cited

U.S. PATENT DOCUMENTS

| | | | |
|---|---|---|---|
| 4,060,913 | A | 12/1977 | Yoshida et al. |
| 4,238,634 | A | 12/1980 | Krogsrud |
| 4,431,612 | A | 2/1984 | Bell et al. |
| 4,457,002 | A | 6/1984 | Mathgen et al. |
| 4,769,045 | A | 9/1988 | Grindley et al. |
| 5,666,891 | A | 9/1997 | Titus et al. |
| 5,811,752 | A | 9/1998 | Titus et al. |
| 5,847,353 | A | 12/1998 | Titus et al. |
| 5,961,870 | A | 10/1999 | Hogan |
| 6,004,384 | A | 12/1999 | Caudle |
| 6,018,542 | A | 1/2000 | Berger |
| 6,066,825 | A | 5/2000 | Titus et al. |
| 6,200,430 | B1 | 3/2001 | Robert |
| RE37,134 | E | 4/2001 | Wilson |
| 6,298,651 | B1 | 10/2001 | Iijima |
| 6,422,822 | B1 | 7/2002 | Holmes |
| 6,466,605 | B1 | 10/2002 | Wittle et al. |
| 6,514,469 | B1 | 2/2003 | Kado et al. |
| 6,638,396 | B1 | 10/2003 | Hogan |
| 6,640,752 | B1 | 11/2003 | Counterman |
| 7,037,484 | B1 | 5/2006 | Brandenburg |
| 7,080,505 | B2 | 7/2006 | Koermer et al. |
| 7,655,703 | B2 | 2/2010 | Batdorf |
| 2001/0013308 | A1 | 8/2001 | Wark et al. |
| 2004/0020359 | A1 | 2/2004 | Koermer et al. |
| 2004/0060915 | A1* | 4/2004 | Maeda ................ 219/145.21 |
| 2004/0084294 | A1 | 5/2004 | Hogan |
| 2007/0089283 | A1 | 4/2007 | Wilson et al. |
| 2007/0261303 | A1* | 11/2007 | Surma et al. ................ 48/197 R |
| 2007/0266633 | A1 | 11/2007 | Tsangaris et al. |
| 2007/0289509 | A1 | 12/2007 | Vera |
| 2008/0059093 | A1 | 3/2008 | Bromberg et al. |
| 2008/0097137 | A1* | 4/2008 | Chapman et al. ............. 588/311 |
| 2008/0135457 | A1 | 6/2008 | Ridge |
| 2008/0182912 | A1 | 7/2008 | Van Den Berg et al. |
| 2008/0251234 | A1 | 10/2008 | Wilson et al. |
| 2009/0000190 | A1 | 1/2009 | Surma et al. |
| 2009/0020456 | A1* | 1/2009 | Tsangaris et al. ............. 208/133 |
| 2009/0133407 | A1 | 5/2009 | Sawyer |
| 2009/0159818 | A1* | 6/2009 | Klemm et al. ............. 250/492.3 |
| 2010/0011664 | A1 | 1/2010 | Ariyapadi et al. |
| 2010/0300871 | A1 | 12/2010 | Batdorf et al. |
| 2011/0126460 | A1 | 6/2011 | Bromberg et al. |
| 2011/0126461 | A1 | 6/2011 | Bromberg et al. |

FOREIGN PATENT DOCUMENTS

| | | |
|---|---|---|
| WO | 2010/138494 A1 | 12/2010 |
| WO | 2010/138516 A1 | 12/2010 |
| WO | 2010/138629 | 12/2010 |

OTHER PUBLICATIONS

International Search Report and Written Opinion dated Jul. 20, 2010 of Application No. PCT/US10/36085.
International Search Report and Written Opinion dated Dec. 13, 2010 of Application No. PCT/US10/36250.
Quapp, et al., "Waste Gasification—Test Results from Plasma Destruction of hazardous, electronic and medical wastes," International Thermal Treatment Technologies Conference, May 16, 2003.
Extended European Search Report for EP Application No. 10781079.8 dated Nov. 3, 2014.

* cited by examiner

PRESSURIZED PLASMA ENHANCED REACTOR

RELATED APPLICATIONS

This invention claims priority to U.S. Provisional Application No. 61/181,099 filed May 26, 2009.

TECHNICAL FIELD

This invention relates to gasification and waste treatment systems. More specifically, this invention relates to high temperature systems used to convert organic matter to useful fuels such as synthesis gas.

BACKGROUND OF THE INVENTION

There have been a number of examples of apparatus and methods for converting organic matter into useful fuel. For example, U.S. Pat. No. 5,666,891 title "Arc Plasma-Melter Electro Conversion System for Waste Treatment and Resource Recovery" describes a system that combines joule heating and plasma heating in a process chamber. In this system, organic materials can be converted into hydrogen rich gasses which may be used as fuels, or which may be converted into other fuels, such as liquid methanol.

The advantages of these systems are readily apparent, as they allow waste products, which normally must be disposed of at some expense, to be converted into fuels, which can then be sold. In this manner, these types of systems convert a cost into revenue source.

As a result, significant research and development related to improving these waste treatment systems is ongoing. Generally speaking, this research attempts to make these systems more efficient and less expensive. The present invention accomplishes both of those goals simultaneously.

SUMMARY OF THE INVENTION

The present invention is an improvement over prior art gasification and vitrification systems that provides numerous advantages over those prior art systems. The main distinguishing feature of the present invention and these prior art systems is that the present invention operates at elevated pressures. The present invention is thus distinguished from the prior art by the use of higher pressures, and the ancillary systems used to contain those pressures. Operation of gasification and vitrification systems at elevated pressures provides numerous advantages over operating at lower pressures, but it presents problems which were heretofore not encountered in the prior art. The present invention provides those advantages, while overcoming those problems.

As an example of the advantages offered by operating at elevated pressures, the gas produced by gasification and vitrification systems typically contains impurities such as inorganic particulate, carbon particles, soot, tars and oils. These impurities are typically handled with additional processing steps. For example, additional reactions of the organic impurities in a high temperature thermal residence chamber can cause these impurities to be converted into gasses, such as CO and $H_2$. By operating at elevated pressures, the present invention reduces the chamber volume that is required to provide the necessary residence time for these reactions to occur, resulting in greater throughput, and thus more efficient operation of the overall system. As a further result, the size of the thermal residence chamber may be reduced, resulting in a cost savings. As yet another further result, the energy necessary to promote these reactions is reduced, resulting in yet another cost savings.

Operations at elevated pressures has the same effect on the other equipment used to scrub impurities from gasification and vitrification systems. Generally, this scrubbing equipment may be sized smaller, able to be operated at higher rates of throughput and with less energy required, thereby resulting in lower capital and operating costs.

Operating gasification and vitrification systems at elevated pressures also presents numerous complications not encountered by the prior art systems. Specifically, operation at elevated pressures requires that all penetrations of the processing chamber have modifications that contain that pressure. For example, many of the gasification and vitrification systems use graphite electrodes to introduce energy into a processing chamber. Seals may be formed between these electrodes and the processing chamber to prevent gasses from escaping from within the processing chamber to the atmosphere surrounding the processing chamber. For example, U.S. Pat. No. 6,018,542 shows one prior art method of forming a seal between the electrode and the processing chamber to prevent the escape of gasses. In this system, the seal also forms an electrode feeder device for allowing a continuous feed of the electrodes while keeping the atmosphere at the exterior of the chamber separate from the atmosphere in the interior of the chamber. This prior art electrode feeding device is shown in the cut away view of FIG. 1.

As shown in FIG. 1, the electrode feeding device includes a mounting flange 1 attached to a cooling and electrical contact assembly housing 2. The mounting flange 1 is constructed to allow the electrode feeding device to be attached about a penetration in a process chamber through which electrodes 3 are introduced. Isolating collar 4 is provided interior to electrical contact assembly housing 2 which holds in place electrical contact collar 5. Isolating collar 4 also prevents power from electrical contact collar 5 from being passed to electrical contact assembly housing 2.

Power and cooling water are provided to electrical contact collar 5 through power and cooling water port 6 which is in communication with electrical contact collar 5 via hose 7 and a wire connection (not shown). A secondary gas purge port 8 is provided to allow the introduction of an inert gas, preferably nitrogen, into the electrode feeding device to flush air from the electrode feeding device. Electrode 3 is inserted through electrical contact collar 5, which passes electrical power to the electrode 3. Cooling water from power and cooling water port 6 prevents overheating of electrical contact collar 5 allowing continuous, high powered operation.

The inner 9 and outer 10 internal sealing mechanisms are each assembled of two flexible bladders 11. Bladders 11 surround electrode 3 and are fitted over insulating bladder supports 12. Passage of gas through bladder inlet 13 allows the bladders to be inflated and deflated. When inflated, bladders 11 tighten around electrode 3 forming an airtight seal. When deflated, bladders 11 loosen from electrode 3 allowing the electrode 3 to slide through the bladder 11. Within the inner 9 and outer 10 internal sealing mechanisms, isolating bladder supports 12 are separated from one and another and bladder assembly flanges 14 by isolators 15. The inner 9 and outer 10 internal sealing mechanisms are each held together by screws 16 threaded through the bladder assembly flanges 14. Bladder assembly flanges 14 also connect electrical contact assembly housing 2 with electrode housing 17. Electrode housing 17 is divided by bellows 18 which allows the inner 9 and outer 10 internal sealing mechanisms to move independently of one another.

While the prior art electrode feeding device described in FIG. 1 is effective at keeping gasses from passing out of the processing chamber when the system is operated at ambient pressures, operation at elevated pressures creates problems unknown in the prior art. For example, the inventors have discovered that when the system is operated at higher pressures, the graphite electrodes are sufficiently porous to allow gasses within the processing chamber to escape through the electrodes themselves. Thus, even though a seal, such as an electrode feeding device, may be used to form a gastight seal between the electrode and the processing chamber, gasses inside the processing chamber are nevertheless forced out of the processing chamber through the electrode itself.

Accordingly, one aspect of the present invention is to prevent the escape of gasses through the electrode. This is accomplished by providing a coating to the graphite electrodes in addition to the sealing mechanisms, such as the electrode feeding device, of the prior art, thereby preventing the pressure from within the processing chamber from forcing gasses through the electrodes into the surrounding atmosphere. Suitable coatings include, but are not limited to, acrylic, cyanoacrylate, epoxy, urethane, poly(methyl methacrylate), and hot melt adhesives.

These coatings may be applied to the electrode with a simple application to the surface of the electrode. Additionally, a vacuum may be applied to the coated electrode to cause these coatings to diffuse into the electrode. Generally, it is preferred that the coating material be sufficiently diffused within the electrode to form a airtight coating on the outer surface, but no so diffused through the electrode as to interfere with the electrode's ability to conduct electricity.

In addition to sealing the electrodes themselves, the present invention provides a method for sealing all of the penetrations into the processing chamber to prevent the escape of gasses, organic materials, vitreous glass, and metals, all of which are contained within the processing chamber during processing. Accordingly, the present invention contemplates both the operation at elevated pressures, and the various techniques described herein for effectively sealing the penetrations to the processing chamber.

BRIEF DESCRIPTION OF THE DRAWINGS

The following detailed description of the embodiments of the invention will be more readily understood when taken in conjunction with the following drawing, wherein.

DETAILED DESCRIPTION OF THE PREFERRED EMBODIMENTS

Figure 1:
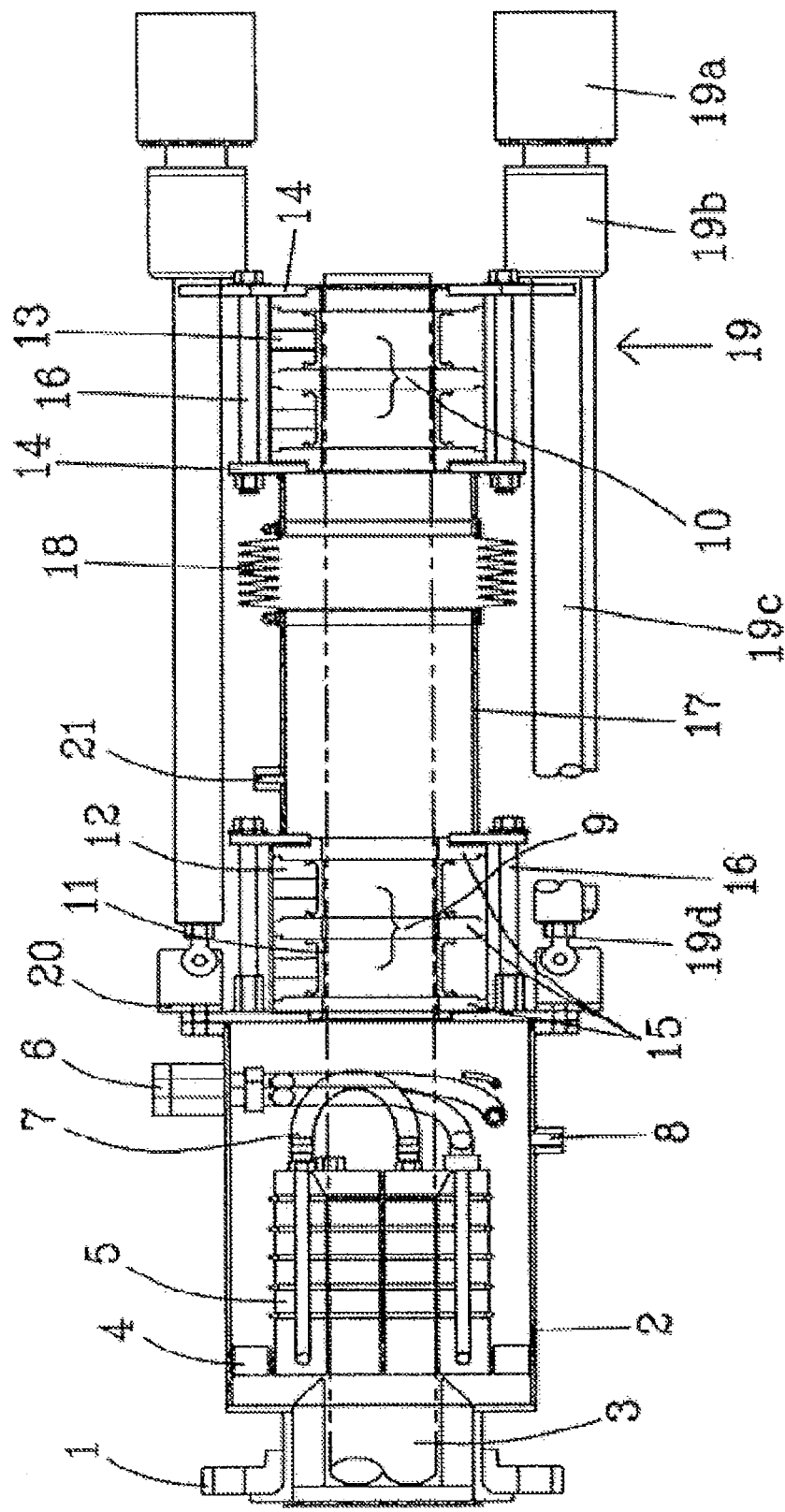
FIG. 1 is an illustration of a prior art system for maintaining the internal atmosphere of a gasification system as separate from the atmosphere external to the system.

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

Figure 2:
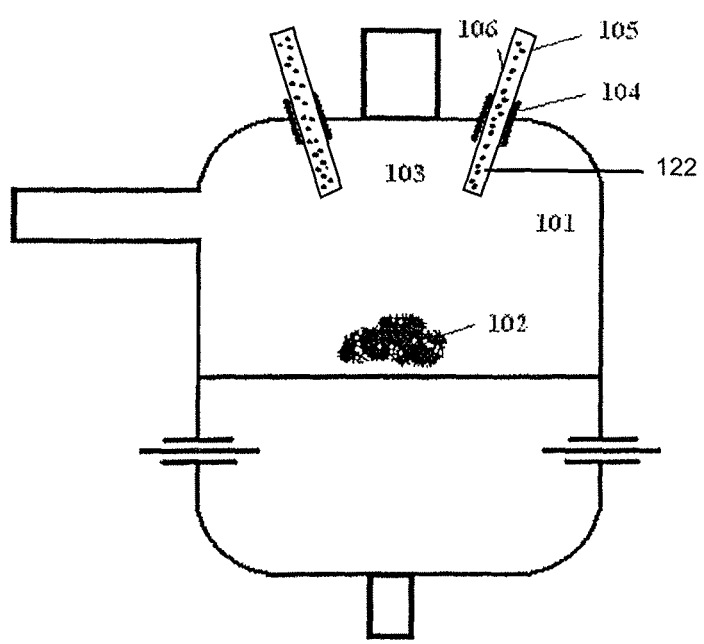
FIG. 2 is an illustration of one embodiment of the present invention.

As show in FIG. 2, one embodiment of the present invention is a processing chamber 101 for converting organic material 102 to useful gas products 103. The processing chamber has at least one port 104, and at least one electrode 105 penetrating the processing chamber 101 through the port 104. Organic material 102 and oxygen are introduced into the processing chamber 101, while maintaining the processing chamber 101 at a pressure of at least 2 atmospheres. Electrical energy is provided to the electrode 105 to induce reactions between the organic material and the oxygen to form synthesis gas 103. As a result of maintaining a pressure of at least 2 atmospheres, the present invention also provides a seal 106 to prevent pressure from inside the processing chamber from expelling organic material 102, oxygen or synthesis gas 103 from the processing chamber 101 through port 104. Seal 106 is preferably provided as described previously, with the combination of electrodes coated with sealing materials 122 and a sealing mechanism between the processing chamber and the electrode, such as an electrode feeding device.

Figure 3:
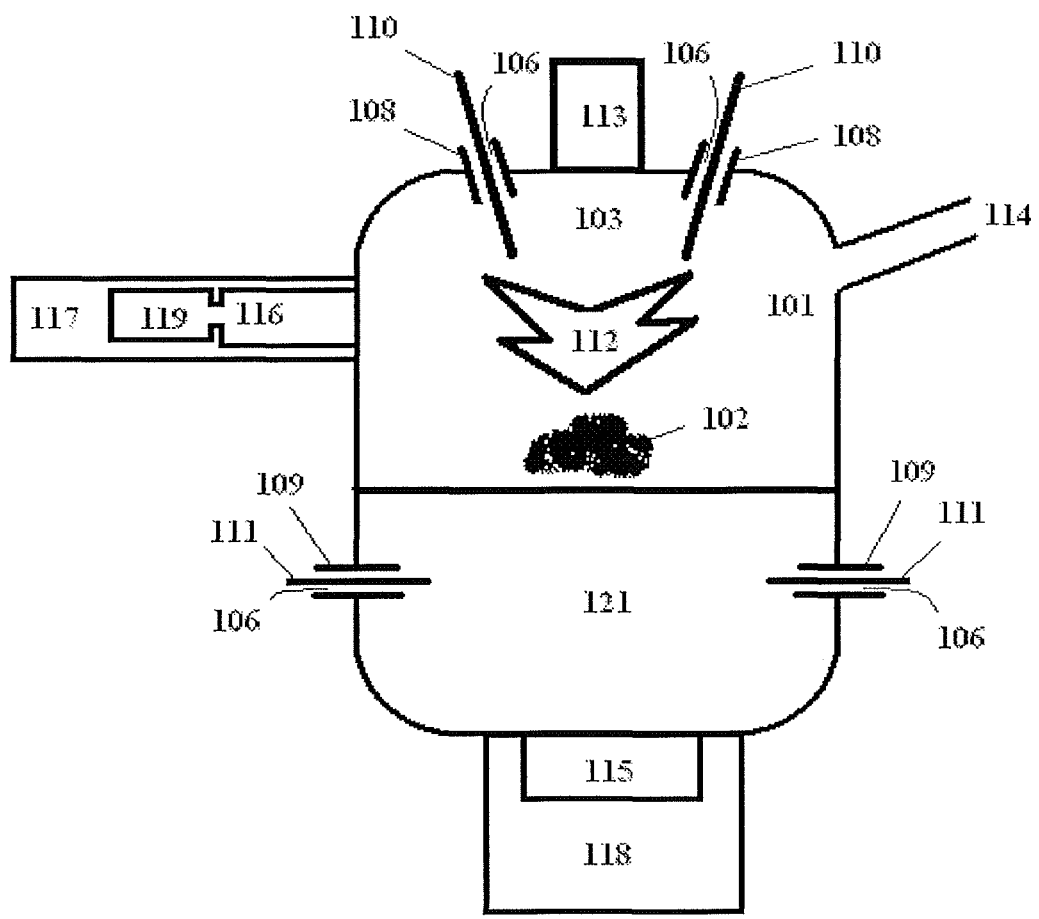
FIG. 3 is an illustration of a second embodiment of the present invention.

Another embodiment of the present invention further provides a method for converting organic compounds to useful gas products and the gas products manufacturing system shown in FIG. 3. The method begins by providing a processing chamber 101 having a set of joule heating ports 109 and a set of plasma heating ports 108 as shown in FIG. 3. A set of joule heating electrodes 111 is provided, with each of the joule heating electrodes 111 penetrating the processing chamber 101 through each of the joule heating ports 109. A set of plasma heating electrodes 110 is provided, with each of the plasma heating electrodes 110 penetrating the processing chamber 101 through each of the plasma heating ports 108. Organic material and oxygen is introduced into the processing chamber 101 while maintaining the processing chamber 101 at a pressure of at least 2 atmospheres. Electrical energy is provided to the joule heating electrodes 111 sufficient to form and maintain a molten glass bath 121 within the processing chamber 101. Electrical energy is provided to the plasma heating electrodes 110 sufficient to form a plasma 112 and to induce reactions between the organic material 103 and the oxygen exposed to the plasma 112 to form synthesis gas. A seal 106 is provided to prevent pressure from inside the processing chamber 101 from expelling organic material, oxygen or synthesis gas from the processing chamber 101 through the ports.

Another embodiment of the present invention may further include a material port 113, an inlet gas port 114, a glass drain port 115, a product gas port 116. Oxygen is introduced to the processing chamber 101 through the inlet gas port 113. Material port 113 has an opening to the outside, where material is introduced to the system, and an opening to the processing chamber 101, where material is fed into the processing chamber. The two openings form an airlock which is operated to prevent pressure from inside the processing chamber 101 from expelling organic material, oxygen and/or synthesis gas from the processing chamber 101 through the material port 113. Gas from within the material port 113 is preferably purged into the processing chamber 101. Seals are provided to prevent pressure from inside the processing chamber 101 from expelling organic material, oxygen or synthesis gas from the processing chamber 101 through the ports. An encapsulation 117 is provided surrounding the product gas port 116 to maintain pressure within the processing chamber 101. The synthesis gas is removed through the product gas port 116 and is preferably routed to a thermal residence chamber 119. Other gas treatment equipment that is conventional and known in the art (not shown) can also be incorporated. Preferably, the output of the thermal residence chamber 119 is provided to other gas treatment equipment for further treatment. An encapsulation 118 surrounding the glass port 115 is provided to control the pressure differential on each side of the glass port 115. Glass from the molten glass bath is removed through the glass port 115.

Figure 5:
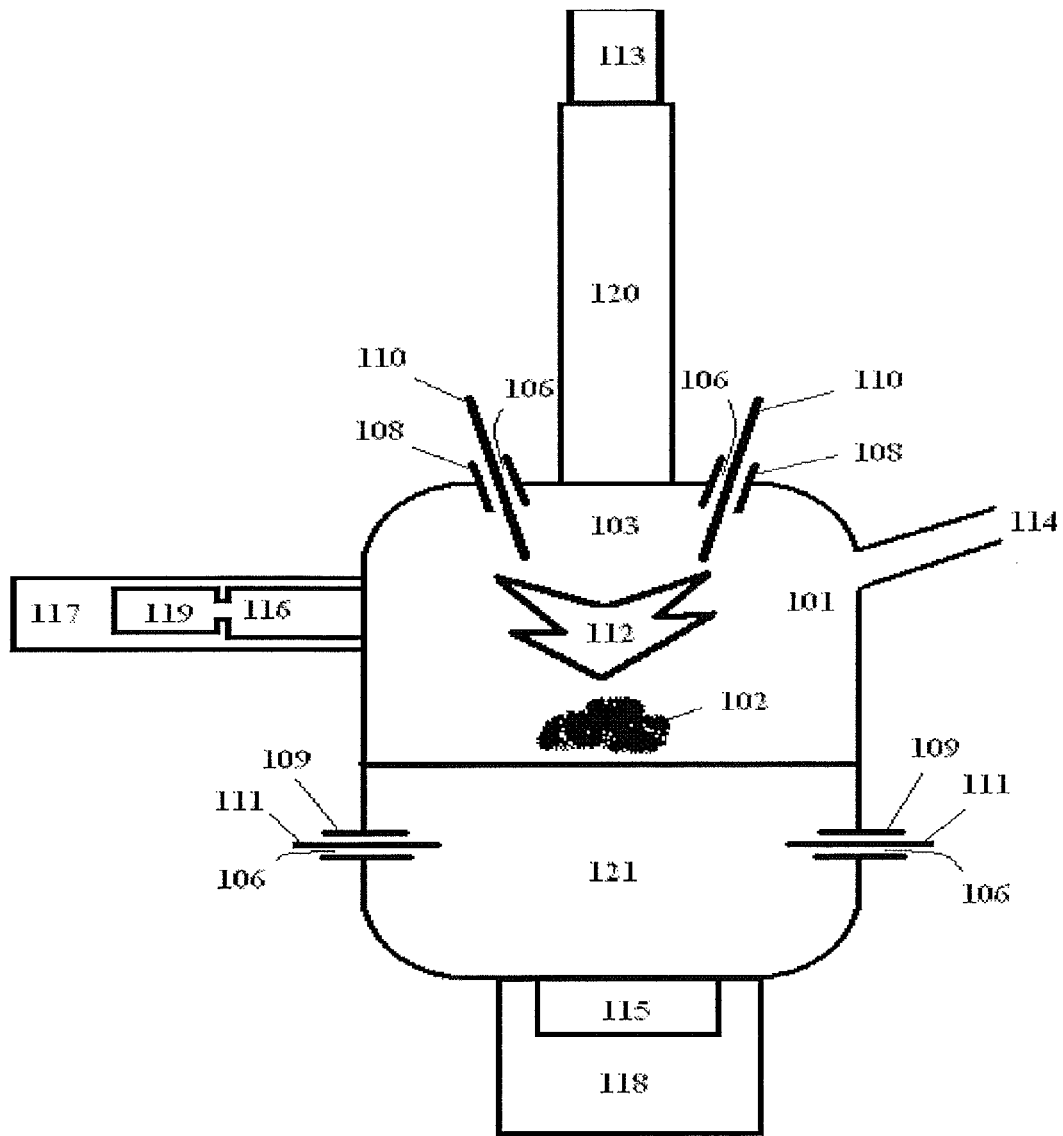
FIG. 5 is an illustration of a third embodiment of the present invention.

Alternatively, the method for converting organic compounds to useful gas products and the gas products manufacturing system may further include a separate gasification system, such as a downdraft gasifier. While the separate gasification system may require an energy source to begin operations, it is preferred that the separate gasification system operates as a result of exothermic reactions between the organic materials fed into the gasifier and oxygen, for example from air, and the separate gasification system therefore does not have a need for an ongoing, external source of power during normal operations. As shown in FIG. 5, the separate gasification system 120 is interposed between the material port 113 and the processing chamber 101.

Figure 4:
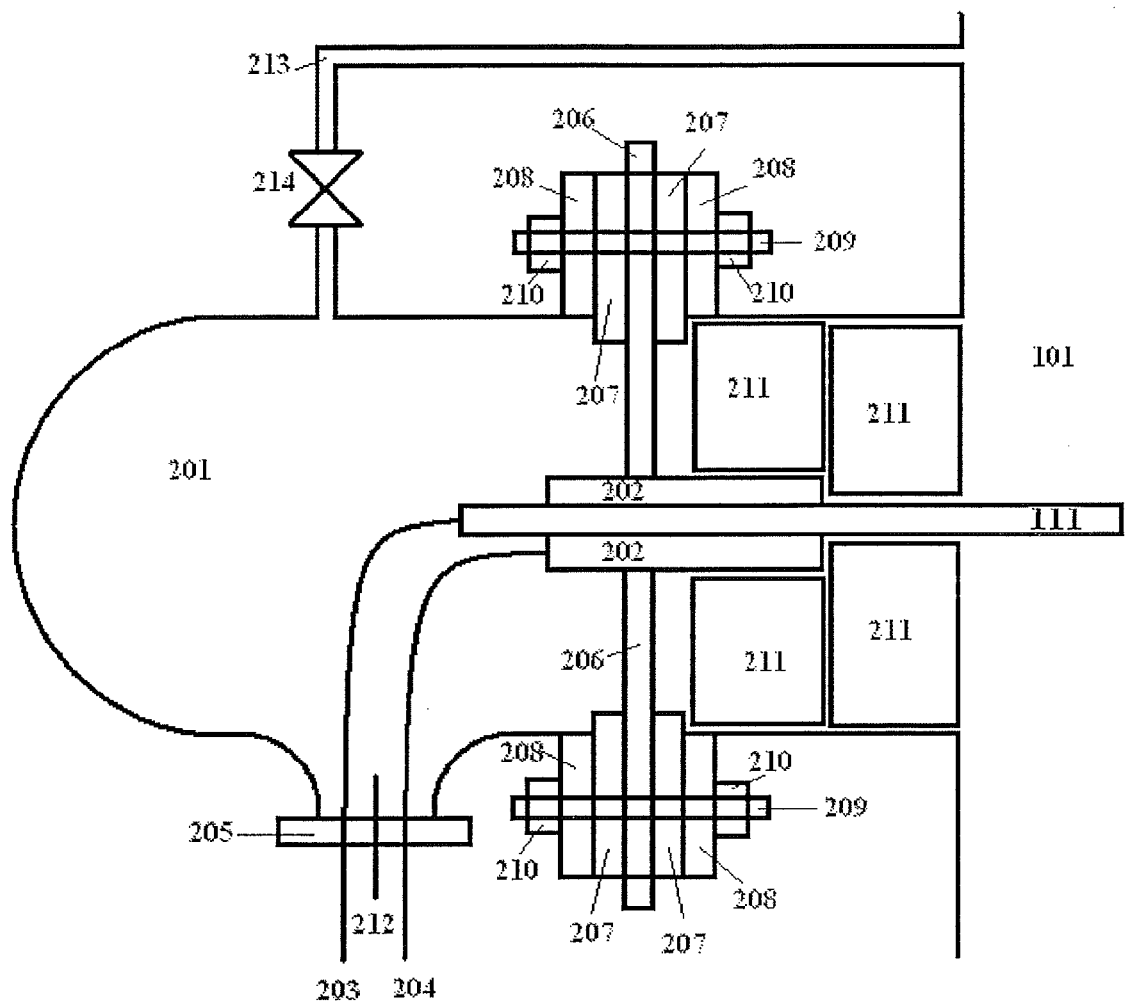
FIG. 4 is an illustration of the arrangement of the joule heating electrodes in one embodiment of the present invention.

FIG. 4 shows a detailed cut away view of one embodiment of the seal for the joule heated electrodes. As shown in FIG. 4, joule heating electrode 111 projects from pressure tank 201 into processing chamber 101. Water cooling jacket 202 surrounds joule heating electrode 111. Power is provided to joule heating electrode 111 through electrical connection 203. Cooling water is provided to joule heating electrode 1111 through water supply 204. Connection flange 205 forms a pressure tight fitting around electrical connection 203, water supply 204, and gas supply 212 sufficient to prevent pressure from within pressure tank 201 from escaping.

AC holder flange 206 holds electrode 111 in place. On either side of AC holder flange 206 are electrical isolators 207. Housing flanges 208 are on the opposite side of electrical isolators 207. Bolt 209 is secured by nuts 210 and then holds the assembly of AC holder flange 206, electrical isolators 207 and housing flanges 208 in place. Refractory blocks 211 provide thermal isolation between pressure tank 201 and processing chamber 101.

It is preferred that the pressure in the pressure tank 201 be maintained as equal to, or even slightly greater than, the pressure in the processing chamber 101. Gas supply is used to provide gas, preferably nitrogen, to pressure tank 201 to maintain that pressure. Line 213 provides communication of the pressure within pressure tank 201 and processing chamber 101. Pressure control valve 214 provides relief to pressure tank by allowing a flow of nitrogen from pressure tank 201 to processing chamber 101.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

The invention claimed is:

1. A gas product manufacturing system comprising:
   a processing chamber having at least one port;
   at least one graphite electrode penetrating the processing chamber through said port, wherein said graphite electrode includes a sealing material diffused in the graphite electrode that creates a seal over an entire exposed surface of the graphite electrode thereby preventing gasses from escaping from the processing chamber through said electrode, and wherein said seal does not interfere with the graphite electrode's ability to conduct electricity; and
   a seal associated with said port for preventing pressure from inside the processing chamber from expelling material from within the processing chamber through the port.

2. The gas product manufacturing system of claim 1 wherein the sealing material comprises acrylic, cyanoacrylate, epoxy, urethane, poly(methyl methacrylate), hot melt adhesive, or combinations thereof.

3. The gas product manufacturing system of claim 1 wherein the processing chamber is in communication with a separate gasification system.

4. The gas product manufacturing system of claim 1, further comprising a pressure tank adjacent to and in fluid communication with the at least one port.

5. The gas product manufacturing system of claim 4, wherein the pressure tank is configured to be maintained at a pressure equal to or greater than a pressure inside the processing chamber.

6. The gas product manufacturing system of claim 4, further comprising refractory blocks configured to provide thermal insulation between the pressure tank and the processing chamber.

7. The gas product manufacturing system of claim 4, further comprising a water cooled jacket disposed inside the pressure tank around a portion of the at least one electrode.

8. A gas products manufacturing system comprising:
   a processing chamber having a plurality of ports for inserting electrodes therethrough;
   one or more joule heating electrodes, each of the joule heating electrodes penetrating the processing chamber through one or more of the plurality of ports; and
   one or more plasma heating electrodes, each of the plasma heating electrodes penetrating the processing chamber through one or more of the plurality of ports;

wherein each of the plurality of ports includes a seal, wherein the one or more plasma heating electrodes are graphite electrodes, and wherein the graphite electrodes include a sealing material diffused in the graphite electrodes that seals entire exposed surfaces of the graphite electrodes thereby preventing pressure from inside the processing chamber from forcing gasses through the graphite electrodes, and wherein said sealing material does not interfere with the graphite electrodes' ability to conduct electricity.

9. The gas product manufacturing system of claim 8 wherein the sealing material comprises acrylic, cyanoacrylate, epoxy, urethane, poly(methyl methacrylate), or hot melt adhesive.

10. The gas product manufacturing system of claim 8 wherein the processing chamber is in communication with a separate gasification system.

11. The gas product manufacturing system of claim 8, further comprising a pressure tank adjacent to and in fluid communication with at least one of the plurality of ports.

12. The gas product manufacturing system of claim 11, wherein the pressure tank is configured to be maintained at a pressure equal to or greater than a pressure inside the processing chamber.

13. A gas products manufacturing system comprising:
a processing chamber including a material port configured to form an air lock, a glass port, a product gas port, one or more joule heating ports, and one or more plasma heating ports;
one or more joule heating electrodes penetrating the processing chamber through each of the joule heating ports;
one or more plasma heating electrodes penetrating the processing chamber through each of the plasma heating ports, the plasma heating electrodes comprising graphite electrodes which include a sealing material diffused in the graphite electrodes that seals entire exposed surfaces of the graphite electrodes thereby preventing gas from escaping from the processing chamber through the plasma heating electrodes, and wherein said sealing material does not interfere with the graphite electrodes' ability to conduct electricity; and
one or more seals for preventing pressure from inside the processing chamber from expelling organic material, oxygen, or synthesis gas from the processing chamber through the one or more joule heating ports or the one or more plasma heating ports.

14. The gas product manufacturing system of claim 13 wherein the sealing material comprises acrylic, cyanoacrylate, epoxy, urethane, poly(methyl methacrylate), hot melt adhesive, or combinations thereof.

15. The gas product manufacturing system of claim 13 wherein the processing chamber is in communication with a separate gasification system.

16. The gas product manufacturing system of claim 13, wherein at least one of the one or more seals includes a pressure tank adjacent to and fluidly coupled to a respective one of the one or more joule heating ports or the one or more plasma heating ports.

17. The gas product manufacturing system of claim 16, wherein the pressure tank is configured to be maintained at a pressure equal to or greater than a pressure inside the processing chamber.

* * * * *